United States Patent Office 3,657,345
Patented Apr. 18, 1972

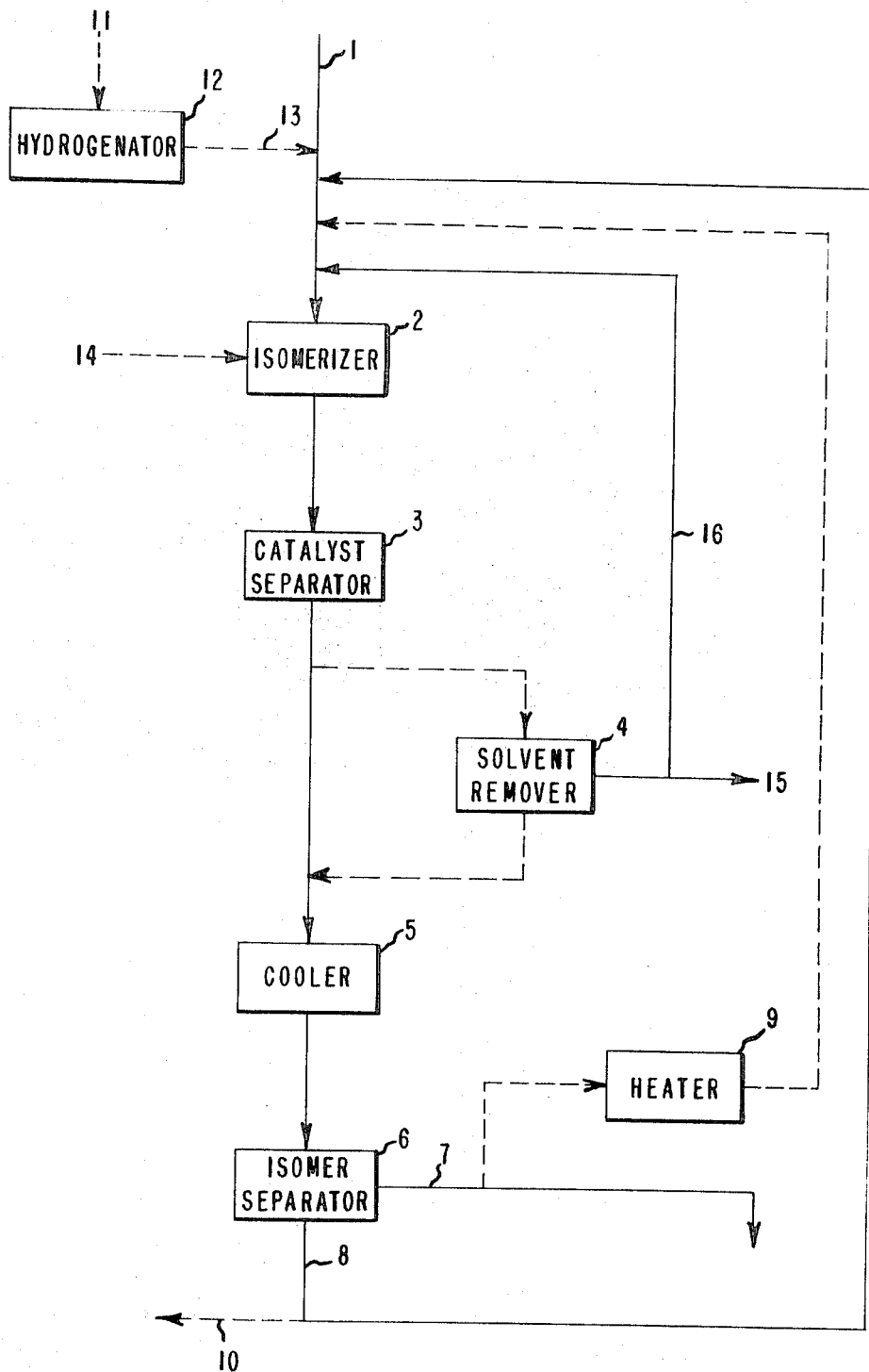

3,657,345
ISOMER ENRICHMENT OF 1,4-CYCLOHEXANE-
DIAMINE
Loren D. Brake, Wilmington, Del., assignor to E. I. du
Pont de Nemours and Company, Wilmington, Del.
Filed Oct. 27, 1969, Ser. No. 869,501
Int. Cl. C07c 85/16
U.S. Cl. 260—563 R          18 Claims

ABSTRACT OF THE DISCLOSURE

A mixture of the stereoisomers of 1,4-cyclohexanediamine not at equilibrium is converted to a mixture of stereoisomers approaching the equilibrium ratio by heating the mixture of stereoisomers to a temperature of from 150° to 300° C. in the presence of hydrogen at a pressure of from 50 to 5,500 pounds per square inch and a total pressure of from 500 to 15,000 pounds per square inch, in the presence of from 0% to 200% by weight, based on the weight of diamine, of added ammonia, and in the presence of from 0.001% to 10% by weight, based on the weight of diamine and calculated as metallic ruthenium, of a ruthenium catalyst supported on an inert carrier, said catalyst being alkali moderated with from 0.05% to 15% of a basic alkali metal compound calculated as the alkali metal. Either essentially pure trans-1,4-cyclohexanediamine or enriched cis-1,4-cyclohexanediamine can be recovered.

SUMMARY

This invention relates to a method for preparing essentially pure trans-1,4-cyclohexanediamine or enriched cis-1,4-cyclohexanediamine.

According to the invention, essentially pure trans-1,4-cyclohexanediamine is prepared by a proces comprising the steps of:

(1) subjecting a material selected from the group consisting of:

(a) a mixture of stereoisomers of 1,4-cyclohexanediamine containing less than the equilibrium concentration of the trans stereoisomer;
(b) para-phenylenediamine; and,
(c) a mixture of (a) and (b), to gaseous hydrogen at a hydrogen partial pressure of from 50 to 5,500 pounds per square inch gage and a total pressure of from 500 to 15,000 pounds per square inch gage, at a temperature of from 150° to 300° C. in the presence of 0% to 200% by weight, based on the weight of diamine, of added ammonia, and in the presence of from 0.001% to 10% by weight, based on the weight of diamine and calculated as metallic ruthenium, of a ruthenium catalyst supported on an inert carrier, the supported catalyst being alkali moderated with from 0.05% to 15% by weight of a basic alkali metal compound calculated as the alkali metal;

(2) cooling the diamine product of step (1) to a temperature of from 10° to 55° C. to precipitate trans-1,4-cyclohexanediamine; and (3) recovering the product of step (2), as essentially pure trans-1,4-cyclohexanediamine.

This invention also contemplates the preparation of a stereoisomeric mixture of 1,4-cyclohexanediamine containing at least 70% of the cis-1,4-cyclohexanediamine isomer. This latter process comprises the steps of:

(1) subjecting a material selected from the group consisting of:

(a) a mixture of steroisomers of 1,4-cyclohexanediamine containing less than the equilibrium concentration of the cis steroisomer;
(b) para-phenylenediamine; and,
(c) a mixture of (a) and (b), to gaseous hydrogen at a hydrogen partial pressure of from 50 to 5,500 pounds per square inch gage and a total pressure of from 500 to 15,000 pounds per square inch gage, at a temperature of from 150° to 300° C. in the presence of 0% to 200% by weight, based on the weight of diamine, of added ammonia, and in the presence of from 0.001% to 10% by weight, based on the weight of diamine and calculated as metallic ruthenium, of a ruthenium catalyst supported on an inert carrier, said catalyst being alkali moderated with from 0.05% to 15% of a basic alkali metal compound calculated as the alkali metal.

(2) cooling the diamine product of step (1) to a temperature of from −5° to 35° C. to precipitate trans-1,4-cyclohexanediamine; and (3) separating the precipitate of step (2) to obtain a liquid containing 1,4-cyclohexanediamine consisting of at least 70% cis-1,4-cyclohexanediamine.

DESCRIPTION OF DRAWING

The processes of this invention are illustrated schematically in the accompanying drawing wherein a mixture of stereoisomers of 1,4-cyclohexanediamine, not at equilibrium concentration, is isomerized to the stereoisomeric equilibrium.

DESCRIPTION OF THE INVENTION

According to the broad concept of this invention, it is possible to take a single stereoisomer of 1,4-cyclohexanediamine, hereinafter called HPPD, or a mixture of the two stereoisomers, characterized in that such stereoisomer or mixture of stereoisomers is at a concentration other than the equilibrium concentration or equilibrium ratio of the stereoisomers, and by subjecting this HPPD to a temperature of from 150° to 300° C. in the presence of hydrogen and an alkali moderated ruthenium catalyst, the stereoisomers, or mixture of stereoisomers is adjusted in concentration or ratio closer to the equilibrium concentration or ratio and, in a preferred embodiment to a concentration or ratio approaching equilibrium, followed by cooling the isomerization product to a temperature of from −5° to 55° C. to precipitate trans-HPPD, separating the two phases such as by filtration giving a solid phase consisting of at least 90% of the trans-HPPD and a liquid phase consisting of at least 70% of the cis-HPPD.

It will be clearly understood that the starting materials in the process of this invention are the hydrogenated saturated stereoisomers of HPPD.

It will also be understood that the expressions "equilibrium concentration" and "equilibrium ratio" are used in their conventional sense to mean the relative proportion of stereoisomeric HPPD components in any given HPPD product, wherein the stereoisomeric component or components are present in a state of greatest stereoisomer stability and lowest free energy. For the two stereoisomers of HPPD, the equilibrium concentration, as well as can be determined analytically, exists in the proportions by weight of about 66.5% trans-stereoisomer and about 33.5% cis-stereoisomer.

It will be understood also that this invention makes it possible to take a plain mixture of, say, 20% by weight of the trans-stereoisomer, and 80% by weight of the cis-stereoisomer of HPPD and convert this mixture readily to, say, a mixture of 67% trans-stereoisomer, and 33% cis-stereoisomer. In the other direction from the equilibrium concentration, it is equally simple according to the present invention to take a stereoisomeric mixture containing, say, about 99% by weight of the trans-stereoisomer, and 1% by weight of the cis-stereoisomer of HPPD and convert this mixture according to the process of the present invention to a mixture containing these two stereoisomers, respectively, in the proportions of approximately 67:33.

Following isomerization, the liquid HPPD product is cooled to between −5° and 55° C. At this point trans-HPPD preferentially precipitates. The precipitated trans-HPPD can be recovered most simply by filtration. For optimum operation of the trans-enrichment process, the filtrate, which is rich in the cis-HPPD is recycled to the isomerizer. If enriched cis-HPPD is desired, then the filtrate can be collected as a product, and the trans-HPPD is reheated and returned as a recycle stream to the isomerizer.

The HPPD which is fed into the isomerizer can be provided from a separate hydrogenator where para-phenylenediamine, hereinafter PPD, is converted to HPPD. The conditions for hydrogenating PPD via the reaction:

are comparable to those of this invention for achieving stereoisomeric equilibrium for HPPD. A method for hydrogenating PPD is disclosed in copending application Ser. No. 813,753 filed Apr. 4, 1969.

It will be readily appreciated that the process for the hydrogenation of PPD to HPPD, wherein such hydrogenation is effected at elevated temperature and pressure and using a caustic moderated ruthenium catalyst supported on an inert carrier can encompass a recycle of part or all of the HPPD back into the hydrogenation-isomerization zone where it is subjected to the conditions of the process of the present invention.

Such a recycle operation in HPPD manufacture thus permits the preparation of a HPPD product at or very close to the equilibrium concentration, which can be followed by crystallization to produce a material high in the trans-stereoisomer. The mother liquor remaining after crystal removal, which is rich in cis-stereoisomer and heretofore considered either waste and yield loss or in any event not useful for the identical purpose as the HPPD at equilibrium concentration or at higher than equilibrium trans-stereoisomer concentrations, is readily recycled back in to the hydrogenation-isomerization zone where it is subjected to the conditions of the present invention and rapidly converted to the desired concentration. The reverse is also possible, that is, to retain the liquid or high cis-stereoisomer mixture and recycle the high trans-stereoisomer fraction for isomerization back to equilibrium concentration. Over-all, this achieves a remarkably high yield of the desired product with production of little or no unwanted by-product.

In a recycle operation the amount of material being recycled will, of course, depend on the amount of undesired stereoisomers present as by-products. It will be understood that there will ordinarily be a larger amount of recycle in those operations where the HPPD originally produced is farther away from the equilibruim concentration of the mixture of stereoisomers or where the desired stereoisomer content to be obtained by a subsequent separation process is farther from the equilibrium.

Illustrative of the general concept of this is the drawing wherein HPPD 1 is fed to the isomerization chamber 2. The HPPD product at isomer equilibrium is separated from the catalyst 3 and is then sent to the cooler 5 unless a diluent has been used. If a diluent is present it is first removed 4 before sending the HPPD product to the cooler 5. Any diluent which is removed can be drawn off 15 or recycled to the isomerizer 16. The chilled HPPD is sent to the isomer separator 6 where solid trans-HPPD is separated 7 and normally taken off as the product. It can however be heated 9 and recycled to the isomerizer when a cis-rich product is desired. The liquid rich in cis-HPPD is taken off 8 and normally recycled to the isomerizer, but it can be recovered as the product 10. The HPPD feed can originate from an on the site hydrogenator 12 wherein PPD 11 is converted to HPPD 13 and fed to the isomerizer. Alternatively PPD can be fed directly 14 to the isomerizer where it is converted to HPPD under the conditions of isomerization.

It will be understood by those skilled in the art that this process can be carried out in a batch operation, or in a continuous or semi-continuous operation.

PROCESS CONDITIONS (A) Step 1.—In step (1), HPPD is subjected to gaseous hydrogen at a hydrogen partial pressure of from 50 to 5,500 pounds per square inch gage and a total pressure of from 500 to 15,000 pounds per square inch gage, at a temperature of from 150° to 300° C. in the presence of from 0% to 200% by weight, based on the weight of diamine, of added ammonia, and in the presence of from 0.001% to 10% by weight, based on the weight of diamine and calculated as metallic ruthenium, of a ruthenium catalyst supported on an inert carrier, said catalyst being alkali moderated with from 0.05% to 15% of a basic alkali metal compound calculated as the alkali metal.

The alkali moderated ruthenium catalyst will be used according to the present invention in an amount of at least 0.001% weight per cent and less than about 10 weight per cent, based on the starting diamine and calculated as metallic ruthenium, and preferably in amounts of from 0.01% to 1% on the same basis.

The ruthenium catalysts suitable for use in the process of this invention are supported on an inert carrier. Suitable inert carriers are described in Chapter 7 of Catalysis by S. Bergman et al., published by Reinhold Publishing Corp., N.Y. (1940) or Chapter 6 of Catalysis, vol. 1 by P. H. Emmett, published by Reinhold Publishing Corp., N.Y. (1940).

Representative of such carriers are carbon; alumina; barium sulfate; kieselguhr; pumice; diaspore; bauxite; periclase; zirconia; diatomaceous earth; calcium sulfate; calcium oxide; barium carbonate; stronthium carbonate; silica; silica-alumina; calcium carbonate; and single or mixed oxides, carbonates, or mixed oxide-carbonates of rare earth metals such as lanthanum, cerium, praseodymium, neodymium, promethium, samarium, europium, gadolinium, terbium, dysprosium, holmium, erbium, thulium, ytterbium, lutetium and yttrium. Preferred catalyst supports are alumina; barium sulfate; kieselguhr; carbon; calcium carbonate; rare earth oxides; rare earth carbonates; and mixed rare earth oxide-carbonates. The most preferred support materials are alumina; barium sulfate; and kieselguhr.

The supported ruthenium catalyst can be prepared, for example, by slurrying the support in an aqueous ruthenium chloride solution, precipitating the ruthenium values with aqueous ammonium bicarbonate, digesting at 60°–90° C., filtering, washing, drying, and activating by means well known in the art. Other means for preparing the catalysts will be obvious to those skilled in the art.

Alkali moderation of the ruthenium catalysts consists of associating a basic alkali metal compound with the catalyst. Preferred basic alkali metal compounds are lithium, cesium, rubidium, sodium and potassium hydroxide, carbonates, bicarbonates, methoxides, ethoxides, propoxides, tert-butoxides and other alkoxides, and sodamide. Alkali moderation can be accomplished by depositing a ruthenium compound on a support from an aqueous solution of sodium or potassium bicarbonate as disclosed in Belgian Pat. No. 691,610, granted Feb. 28, 1967, or by treating a supported ruthenium catalyst prior to reduction with dilute sodium or potassium hydroxide or by treating a supported ruthenium catalyst after reduction, such as in situ treatment of the catalyst with sodium, lithium or potassium methoxide during a hydrogenation reaction also disclosed in Belgian Pat. No. 691,610.

Extent of alkali moderation can be determined by analysis of the treated catalyst for alkali metal content using conventional analytical means such as atomic absorption spectrophotometry. Thus, for example, if a cataly analyzes 5 weight percent sodium, it is considered to be alkali moderated to the extent of 5%. The extent of alkali moderation can range from 0.05% up to 15%, depending to some degree on the support. An alumina support, for example, will associate to a different degree with a basic alkali metal compound than will a barium sulfate support. It is preferred that the extent of alkali moderation lie in the range of 0.1% to 10%.

This process can be carried out at elevated temperatures and pressures. Temperatures on the order of 150° C. to 300° C., and preferably about 180° C. to 225° C., should be used.

The process is run at hydrogen partial pressures above about 50 pounds per square inch gage and preferably from about 500 to 5,500 pounds per square inch gage. Higher hydrogen partial pressures can, of course, be used but little practical advantage is obtained. Similarly lower hydrogen partial pressures can be used, pressures as low as 1 pound per square inch gage still permitting smooth operation. However, yields generally are somewhat poorer at these low hydrogen pressures so that they are ordinarily avoided. Ordinarily, total pressures during isomerization range from about 500 pounds per square inch gage up to about 15,000 pounds per square inch gage, these being practical limits for reasons of cost of operation and equipment.

The isomerization reaction can be carried out in the presence or absence of an inert organic diluent. It is preferred to employ no diluent since the addition of diluents tends to reduce catalyst life. When a diluent is to be used in the isomerization step of this invention, suitable diluents would include liquids not subject to hydrogenation under the conditions employed. Representative of the suitable diluents are saturated aliphatic and alicyclic hydrocarbons such as cyclohexane, hexane, cyclooctane; low molecular weight alcohols such as methyl alcohol, ethyl alcohol, isopropyl alcohol, n-butanol, and the aliphatic and alicyclic hydrocarbon ethers, such as n-propyl ether, n-butyl ether, ethyl ether, isopropyl ether, isobutyl ether, the amyl ethers, tetrahydrofuran, dioxalane, dioxane, dicyclohexyl ether, and others. Water can also be used as a diluent as can mixtures of two or more of the above diluents.

When a diluent is used, it can be used in concentrations as low as about 0.2 part of diluent per part of starting diamine introduced into the reaction. However, amounts of diluent from about 25% to 150% of the weight of starting diamine will normally be used. Greater amounts of diluent can be used, of course, even as high as 1,000% to 2,000% based on the starting diamine, but such amounts dilute the components in the reaction mass with no particular advantage obtained.

Ammonia in amounts of from 0% to about 200% by weight based on the weight of diamine reactant can be used as an additive in the process of this invention, and there appears to be no upper limit to the amount of ammonia which can be present without deleterious effect on the process. The presence of ammonia imparts little or no observable benefit in the isomerization of the stereoisomers of HPPD to equilibrium ratio; however, in the hydrogenation of PPD to HPPD, it is preferred to have 5% to 40% ammonia based on the weight of the diamine reactant to prevent excessive by-product formation.

Following isomerization the catalyst is separated from the product such as by filtration and the diluent, if diluent was used, is removed by any convenient means such as distillation. In a continuous isomerization system the product draw-off can, of course, be arranged to leave the catalyst in the isomerizer.

(B) Step 2.—The HPPD from the above step is cooled to a temperature between −5° and 55° C. The trans-HPPD isomer will preferentially crystallize in the temperature range of 10° to 55° C. Cooling below 10° C. results in crystallization of the cis-isomer while cooling to 55° C. is required to initiate crystallization of the trans-isomer. The preferred conditions for recovering high trans-HPPD (>90% trans-isomer) is to carry out the crystallization step between 10° and 55° C. Crystallization can be carried out in the presence or absence of an added diluent, but it is preferred to employ no diluent in the crystallization step when high trans-HPPD is to be recovered. The conditions for recovering a cis rich HPPD (>70% cis-isomer) is to carry out the crystallization step between −5° and 35° C. It is preferred to employ no diluent in the crystallization step if the desired cis concentration is below 75–80%.

Suitable diluents for use include liquids not subject to reaction with HPPD under the conditions employed. Representative of the suitable diluents are saturated aliphatic and alicyclic hydrocarbons such as pentane, cyclohexane, hexane, cyclooctane, and the aliphatic ethers, such as n-propyl ether, n-butyl ether, ethyl ether, isopropyl ether, isobutyl ether, the amyl ethers, and others. Mixtures of two or more of the above diluents can also be employed.

When a diluent is used, it can be used in concentrations as low as about 0.2 part of diluent per part of HPPD. However, amounts of diluent from about 25% to 200% of the weight of HPPD will normally be used. Greater amounts of diluent can be used, but such amounts merely dilute the components with no particular advantages obtained.

The amine products of this invention tend to form carbonates. Therefore, the use of a closed system during cooling and filtering (step(3)) is required.

(C) Step 3.—The solid material, which is rich in the trans-isomer is collected ordinarily by filtration or centrifugation. Generally the product will be essentially pure and preferably will contain at least 90% of the trans-isomer. The most preferred product will contain 99.9% trans-HPPD which usually necessitates the removal of the liquid phase containing the cis-isomer wetting the surface of the solid by washing with an inert organic liquid. Representative of suitable organic liquids for washing the solids are saturated aliphatic hydrocarbons, such as hexane, pentane, cyclohexane and aliphatic ethers, such as isopropyl ether, n-propyl ether, ethyl ether and others.

When a wash liquid is used, it can be used in concentrations as low as 0.2 part per part of HPPD. However, amounts of liquid wash from about 10% to 100% of the weight of HPPD will normally be used. Greater amounts of wash can, of course, be used, but such amounts have no particular advantages.

The filtrate rich in the cis-isomer will generally contain about 70% cis- and 30% trans-isomers at room temperature. When the cis-rich liquid is the product, it is preferred to have a cis content of 75% and most preferably 85%.

Any suitable device for separating solids and liquids can be used to accomplish separation of the two isomers. Filtration and centrifugation are convenient and practical and offer an opportunity for washing the solids if desired.

The products of this invention are useful in producing polymers. Thus, the trans-isomers can be reacted with isocyanato-terminated prepolymers to prepare polyurethanes according to the process shown in U.S. Pat. No. 2,929,800 to Hill. The cis-rich isomers can be used as curing agents for bisphenol type epoxy resins. Both types of isomers can be reacted with organic dicarboxylic acids, such as sebacic acid, to form polyamides having a high melting point.

This invention will be better understood by reference to the following illustrative examples wherein parts and percentages are by weight unless otherwise specified.

EXAMPLE 1

In a steel autoclave fitted with a stirring apparatus there is placed 200 parts of 1,4-cyclohexanediamine containing about 70% cis-, and 30% trans-stereoisomers, 15 parts of a catalyst comprising about 5% ruthenium on a finely divided alumina, and 2.5 parts of sodium methoxide. The diamine is heated to 200° C. with stirring while hydrogen is added to maintain a pressure of 4500 pounds per square inch gage for 30 minutes. The resulting mixture is freed of catalyst by filtration. Final distillation under vacuum gives the fully saturated mixture of stereoisomers of 1,4-cyclohexanediamine in an amount equal to a recovery of 99.0% based on the saturated compound added. The resulting product stereoisomer content is 33.0% cis-, and 67.0% trans-stereoisomers.

The resulting distillate is cooled to 30° C. under a nitrogen atmosphere. The solid phase is separated by filtration under a nitrogen atmosphere and washed with 70 parts of n-hexane to remove the liquid diamine from the solid phase. The solid phase is dried overnight with a stream of nitrogen. The dried solid phase stereoisomer content is greater than 99.9% of the trans-stereoisomer and represents 117 parts of 1,4-cyclohexanediamine. The liquid phase containing the hexane wash yields 75 parts of diamine consisting of 77% cis-, and 23% trans-stereoisomers.

EXAMPLE 2

At a temperature of 225° C. and a hydrogen pressure of 5,000 pounds per square inch gage, 200 parts of 1,4-cyclohexanediamine containing about 80% cis-, and 20% trans-stereoisomers is subjected to an atmosphere of hydrogen in the presence of 10 parts of a catalyst comprising about 5% ruthenium supported on a finely divided barium sulfate and 2 parts of sodium methoxide for 20 minutes. The resulting mixture is freed of catalyst by filtration. Final distillation under vacuum gives the fully saturated mixture of stereoisomers of 1,4-cyclohexanediamine in an amount equal to a recovery of 98.7% based on the saturated compound added. The resulting product stereoisomer content is 32.5% cis-, and 67.5% trans-stereoisomers.

The resulting distillate is cooled to 30° C. under a nitrogen atmosphere. The solid phase is separated by filtration under a nitrogen atmosphere and washed with 100 parts of n-hexane to remove the last traces of liquid diamine from the crystal surface. The solid phase is dried overnight with a stream of dry nitrogen. The dried solid phase stereoisomer content is greater than 99.9% of the trans-stereoisomer and represents 114 parts. The liquid phase containing the hexane wash yields 78 parts of diamine with a stereoisomer content of 76% cis- and 24% trans-stereoisomers.

EXAMPLE 3

In a steel autoclave fitted with a stirring apparatus there is placed 200 parts of 1,4-cyclohexanediamine containing about 80% cis-, and 20% trans-stereoisomers, 10 parts of a catalyst comprising about 5% ruthenium on a finely divided alumina and 2 parts of sodium methoxide. The diamine is heated to 210° C. with stirring in the presence of hydrogen maintained at a pressure of 4,500 pounds per square inch gage for 30 minutes. The resulting mixture is freed of catalyst by filtration. Final distillation under vacuum gives the fully saturated mixture of stereoisomers of 1,4-cyclohexanediamine in an amount equal to a recovery of 98.5% based on the saturated compound added. The resulting product stereoisomer content is 33.8% cis-, and 66.2% trans-stereoisomers.

The resulting distillate is cooled to 25° C. under a nitrogen atmosphere. The solid phase is separated by filtration under a nitrogen atmosphere and washed with n-hexane to remove the liquid diamine adhering to the solid phase. The solid phase is dried overnight with a stream of dry nitrogen. The dried solid phase stereoisomer content is greater than 99.9% of the trans-stereoisomer and represents 115 parts of 1,4-cyclohexanediamine. The liquid phase containing the hexane wash yields 74 parts of 1,4-cyclohexanediamine consisting of 78.0% cis-, and 22.0% trans-stereoisomers.

EXAMPLES 4–7

Example 3 is repeated substituting for the sodium methoxide the alkali metal compound listed below in the amount indicated. Similar results to those of Example 3 are obtained:

| Example | Alkali metal compound | Amount |
| --- | --- | --- |
| 4 | Lithium methoxide | 20 parts of 10% solution in methanol. |
| 5 | Sodamide | 2.5 parts. |
| 6 | Potassium hydroxide | 0.75 part of 50% aqueous solution. |
| 7 | Sodium hydroxide | 0.50 part of 50% aqueous solution. |

EXAMPLE 8

A solution is prepared consisting of 5.6 parts ruthenium chloride, 6.7 parts 37% hydrochloric acid, and 67.7 parts of water. This solution is warmed to 65° C., whereupon addition of a solution of 20 parts sodium bicarbonate in 190 parts of water is begun. When ⅓ of the latter solution is added the support material is dumped into the stirring solution. The support consists of an intimate physical mixture of 50 parts eta alumina and 0.75 parts sodium methoxide. The remaining sodium bicarbonate solution is added at such a rate that approximately 4 minutes is required to add it all. The resulting slurry is then digested for one hour at 65–70° C., filtered, then washed with 1200 parts of sodium bicarbonate solution in water. The product is given an additional wash with 800 parts of a 5% sodium hydroxide solution in water, then sucked dry. The air dried cake is further dried at 150° C. then activated prior to use at 170–200° C. in a stream consisting of 95% nitrogen and 5% hydrogen.

By assay, the above catalyst contains 1.6% sodium by weight. Ten parts of the above prepared catalyst is mixed with 100 parts of 1,4-cyclohexanediamine containing about 10% cis-, and 90% trans-stereoisomers and 75 parts dioxane and the resulting mixture is subjected to an atmosphere of hydrogen at 210° C. and a total pressure of 4000 pounds per square inch gage for 25 minutes. The resulting mixture is freed of catalyst by filtration. Final distillation under vacuum gives the fully saturated mixture of stereoisomers of 1,4-cyclohexanediamine in an amount equal to 98.5% based on the saturated compound added. The resulting product stereoisomer content is 31.5% cis-, and 68.5% trans-stereoisomers.

The resulting distillate is cooled to 25° C. under a nitrogen atmosphere. The solid phase is separated by filtration under nitrogen. The solid phase steroisomer content is 8.0% cis-, and 92% trans-stereoisomers. The liquid phase yields 30 parts of diamine consisting of 79.8% cis-, and 20.2% trans-stereoisomers.

EXAMPLE 9

At a temperature of 210° C. and a total pressure of 5,000 pounds per square inch gage, 100 parts of 1,4-cyclohexanediamine containing about 75% cis-, and 25% trans-stereoisomers, 10 parts of a catalyst comprising about 5% ruthenium on alumina, 2 parts of sodium methoxide and 90 parts of di-n-butyl ether is subjected to an atmosphere of hydrogen for 30 minutes. The resulting mixture is freed of catalyst by filtration. Distillation under vacuum gives the fully saturated mixture of stereoisomers. The product has a stereoisomer content of 33.5% cis-, and 66.5% trans-stereoisomers. The stereoisomers are separated as described in Example 8.

EXAMPLES 10–14

The isomerization reaction of Example 9 is repeated substituting for the di-n-butyl ether the solvent listed below in the amount indicated. Similar results to those of Example 9 are obtained.

| Example | Solvent | Amount, parts |
| --- | --- | --- |
| 10 | Tetrahydrofuran | 50 |
| 11 | Di-n-propyl ether | 200 |
| 12 | Methanol | 100 |
| 13 | n-Butanol | 25 |
| 14 | Ethanol | 75 |

EXAMPLE 15

In a steel autoclave fitted with a stirring apparatus there is placed 100 parts of 1,4-cyclohexanediamine containing about 75% cis-, and 25% trans-stereoisomers, 100 parts para-phenylenediamine, 10 parts of a catalyst comprising about 5% ruthenium on a finely divided kieselguhr, 1.5 parts of sodium methoxide and 30 parts of ammonia. The mixture is heated to 225° C. with stirring while pressuring with hydrogen to 5,000 pounds per square inch gage and being maintained until hydrogen consumption stops. The resulting mixture is freed of catalyst by filtration. Final distillation under vacuum gives the fully saturated mixture of stereoisomers of 1,4-cyclohexanediamine. The resulting product stereoisomer content is 32.0% cis- and 68.0% trans-stereoisomers.

The resulting distillate is cooled to 30° C. under a nitrogen atmosphere. The solid phase is separated by filtration under a nitrogen atmosphere and washed with n-hexane to remove the liquid diamine from the solid phase. The solid phase is dried overnight with a stream of dry nitrogen. The dried solid stereoisomer content is 99.8% of the trans-stereoisomer. The diamine in the liquid phase containing the hexane wash consists of 75.2% cis-, and 24.8% trans-stereoisomers.

EXAMPLE 16

In a steel autoclave fitted with a stirring apparatus there is placed 2,000 parts of 1,4-cyclohexanediamine containing about 80% cis-, and 20% trans-stereoisomers, 60 parts of a catalyst comprising about 5% ruthenium on a finely divided alumina and 12 parts of sodium methoxide. The mixture is heated to 190° C. with stirring and hydrogen is added to maintain a pressure of 3,500 pounds per square inch gage for 50 minutes. The resulting mixture is freed of catalyst by filtration. Final distillation under vacuum gives the fully saturated mixture of stereoisomers of 1,4-cyclohexanediamine in an amount equal to a recovery of 98.0% based on the saturated compound added. The resulting product stereoisomer content is 33.4% cis-, and 66.6% trans-stereoisomers.

The resulting distillate is cooled to 15° C. under a nitrogen atmosphere. The solid phase is separated by filtration under a nitrogen atmosphere and washed with 100 parts of n-hexane to remove the liquid diamine from the solid phase. The solid phase is dried overnight with a stream of dry nitrogen. The dried solid stereoisomer contains 99.8% of the trans-stereoisomer.

EXAMPLE 17

In a steel autoclave fitted with a stirring apparatus and a product draw off system retaining the catalyst in the reactor, there is placed 2,000 parts of 1,4-cyclohexanediamine and 57 parts ruthenium on aluminum catalyst recovered from Example 16. The material is heated to 222° C. with stirring and hydrogen is added to maintain a pressure of 4,500 pounds per square inch gage. Additional 1,4-cyclohexanediamine containing about 81% cis-, and 19% trans-stereoisomers is fed to the autoclave at such a rate as to maintain a 45 minute resident time while product is drawn off to maintain a fixed reactor volume. Final distillation of the product under vacuum gives the fully saturated mixture of stereoisomers of 1,4-cyclohexanediamine. The product stereoisomer content is 32.5% cis-, and 67.5% trans-stereoisomers.

EXAMPLE 18

A mixture of 200 parts of the 1,4-cyclohexanediamine recovered from Example 17 is mixed with 100 parts of di-n-butyl ether and cooled to 25° C. with stirring and under a nitrogen atmosphere. The solid phase is separated by filtration under a nitrogen atmosphere and washed with 50 parts of di-n-butyl ether and dried with a stream of dry nitrogen overnight. The solid phase stereoisomer contains 99.7% of the trans-stereoisomer. The diamine in the liquid phase consists of 70.0% cis-, and 30.0% trans-stereoisomers.

EXAMPLE 19

The liquid phase recovered from Example 18 is cooled to −5° C. with stirring. The solid phase is separated by filtration under a nitrogen atmosphere. The solid phase consists of 62.7% cis-, and 37.3% trans-stereoisomers. The diamine in the liquid phase consists of 87.2% cis-, and 12.8% trans-stereoisomers.

EXAMPLE 20

A mixture of 200 parts of the 1,4-cyclohexanediamine recovered from Example 17 is mixed with 50 parts of n-hexane and cooled to 30° C. with stirring and under a nitrogen atmosphere. The solid phase is separated by filtration under a nitrogen atmosphere, washed with 50 parts of n-hexane and dried with a stream of dry nitrogen overnight. The solid phase stereoisomer contains 99.9% of the trans-stereoisomer. The diamine in the liquid phase consists of 74.2% cis-, and 25.8% trans-stereoisomers.

EXAMPLE 21

The liquid phase recovered from Example 20 is cooled to −5° C. with stirring and under a nitrogen atmosphere. The solid phase is separated by filtration under a nitrogen atmosphere. The solid phase consists of 55.2% cis-, and 44.8% trans-stereoisomers. The diamine in the liquid phase consists of 87.1% cis-, and 12.9% trans-stereoisomers.

EXAMPLE 22

A mixture of 100 parts of 1,4-cyclohexanediamine containing about 70% cis-, and 30% trans-stereoisomers. 75 parts of dioxane, 10 parts of a catalyst comprising about 8% ruthenium on kieselguhr, and 1.5 parts of sodium methoxide is heated to 210° C. while pressuring to 4,000 pounds per square inch gage with hydrogen and maintaining the pressure and temperature for 40 minutes. The resulting product stereoisomer content is 33.5% cis-, and 66.5% trans-stereoisomers. The stereoisomers are separated as in Example 15.

EXAMPLE 23

A mixture of 100 parts of 1,4-cyclohexanediamine containing about 75% cis-, and 25% trans-stereoisomers, 75 parts of dioxane, 10 parts of a catalyst comprising about 3% ruthenium on alumina, and 1.5 parts of sodium methoxide, is pressured to 500 pounds per square inch with hydrogen and held at 180° C. for 60 minutes. The resulting product stereoisomer content is 35.5% cis-, and 64.5% trans-stereoisomers. The stereoisomers are separated as in Example 15.

EXAMPLE 24

At a temperature of 180° C. and a total pressure of 5,000 pounds per square inch gage, 150 parts of 1,4-cyclohexane-diamine containing about 75% cis-, and 25% trans-stereoisomers, 10 parts of a catalyst comprising about 5% ruthenium on rare earth oxides, 0.5 parts of potassium tert-butoxide and 50 parts of di-n-butyl ether are subjected to an atmosphere of hydrogen for 40 minutes. The resulting mixture is freed of catalyst by filtration. Distillation under vacuum gives the fully saturated mixture of stereoisomers in an amount equal to a recovery of 98.2% based on the starting saturated compound. The product has a stereoisomer content of 33.5% cis-, and 66.5% trans-stereoisomers. The stereoisomers are separated as in Example 15.

EXAMPLE 25

At a temperature of 240° C. and a hydrogen pressure of 4,000 pounds per square inch gage, 100 parts of 1,4-cyclohexanediamine containing about 75% cis-, and 25% trans-stereoisomers, 100 parts of cyclohexane, 10 parts of a catalyst comprising 5% ruthenium on calcium carbonate, 1 part of sodium methoxide, and 10 parts of ammonia, are subjected to an atmosphere of hydrogen for 12 minutes. The resulting mixture is freed of catalyst by filtration. Distillation under vacuum gives the fully saturated mixture of stereoisomers. The product has a stereoisomer content of 33.0% cis-, and 67.0% trans-stereoisomers. The stereoisomers are separated as in Example 15.

I claim:

1. A process for the preparation of essentially pure trans-1,4-cyclohexanediamine comprising the steps of:
   (1) subjecting a material selected from the group consisting of:
      (a) a mixture of stereoisomers of 1,4-cyclohexanediamine containing less than the equilibrium concentration of the trans-stereoisomer;
      (b) para-phenylenediamine; and
      (c) a mixture of (a) and (b);
   to gaseous hydrogen at a hydrogen partial pressure of from 50 to 5,500 pounds per square inch gage and a total pressure of from 500 to 15,000 pounds per square inch gage, at a temperature of from 150° to 300° C. in the absence of added ammonia, and in the presence of from 0.001% to 10% by weight, based on the weight of diamine and calculated as metallic ruthenium, of a ruthenium catalyst supported on an inert carrier, the supported catalyst being alkali moderated with from 0.05% to 15% by weight of a basic alkali metal compound calculated as the alkali metal;
   (2) cooling the diamine product of step (1) to a temperature of from 10° to 55° C. to precipitate trans-1,4-cyclohexanediamine; and
   (3) recovering the precipitate of step (2) as essentially pure trans-1,4-cyclohexanediamine.

2. The process of claim 1 wherein the liquid 1,4-cyclohexanediamine by-product of step (3) is recycled to step (1).

3. The process of claim 1 wherein the catalyst carrier is selected from the group consisting of alumina, barium sulfate, kieselguhr, carbon, calcium carbonate, rare earth oxides, rare earth carbonates, and mixed rare earth oxide carbonates.

4. The process of claim 1 wherein the catalyst carrier is selected from the group consisting of alumina, barium sulfate and kieselguhr.

5. The process of claim 1 wherein the catalyst is moderated with from 0.1% to 10% by weight of a basic alkali metal compound calculated as the alkali metal.

6. The process of claim 5 wherein basic alkali metal compound is selected from the group consisting of (i) the hydroxides, carbonates, bicarbonates, and alkoxides of sodium, lithium, cesium, rubidium, and potassium, and (ii) sodamide.

7. The process of claim 1 wherein the temperature in step (1) varies from 180° C. to 225° C.

8. The process of claim 1 wherein the essentially pure trans-1,4-cyclohexanediamine contains at least 90% trans-1,4-cyclohexanediamine.

9. The process of claim 1 wherein the essentially pure trans-1,4-cyclohexanediamine contains at least 99.9% trans-1,4-cyclohexanediamine.

10. A process for the preparation of a stereoisomeric mixture of 1,4-cyclohexanediamine containing at least 70% of the cis-stereoisomer comprising the steps of:
    (1) subjecting a material selected from the group consisting of:
       (a) a mixture of stereoisomers of 1,4-cyclohexanediamine containing less than the equilibrium concentration of the cis-stereoisomer;
       (b) para-phenylenediamine; and
       (c) a mixture of (a) and (b);
    to gaseous hydrogen at a hydrogen partial pressure of from 50 to 5,500 pounds per square inch gage and a total pressure of from 500 to 15,000 pounds per square inch gage, at a temperature of from 150° to 300° C. in the absence of added ammonia, and in the presence of from 0.001% to 10% by weight, based on the weight of diamine and calculated as metallic ruthenium, of a ruthenium catalyst supported on an inert carrier, the supported catalyst being alkali moderated with from 0.05% to 15% by weight of a basic alkali metal compound calculated as the alkali metal;
    (2) cooling the diamine product of step (1) to a temperature of from 5° to 35° C. to precipitate trans-1,4-cyclohexanediamine; and
    (3) separating the precipitate of step (2) to obtain a liquid containing 1,4-cyclohexanediamine consisting of at least 70% cis-1,4-cyclohexanediamine.

11. The process of claim 10 wherein the precipitate separated in step (3) is recycled to step (1).

12. The process of claim 10 wherein the catalyst carrier is selected from the group consisting of alumina, barium sulfate, kieselguhr, carbon, calcium carbonate, rare earth oxides, rare earth carbonates, and mixed rare earth oxide-carbonates.

13. The process of claim 10 wherein the catalyst carrier is selected from the group consisting of alumina, barium sulfate and kieselguhr.

14. The process of claim 10 wherein the catalyst is moderated with from 0.1% to 10% by weight of a basic alkali metal compound calculated as the alkali metal.

15. The process of claim 14 wherein basic alkali metal compound is selected from the group consisting of (i) the hydroxides, carbonates, bicarbonates, and alkoxides of sodium, lithium, cesium, rubidium, and potassium, and (ii) sodamide.

16. The process of claim 10 wherein the temperature in step (1) varies from 180° C. to 225° C.

17. The process of claim 10 wherein the 1,4-cyclohexanediamine product contains at least 75% cis-1,4-cyclohexanediamine.

18. The process of claim 10 wherein the 1,4-cyclohexanediamine product contains at least 85% cis-1,4-cyclohexanediamine.

References Cited

UNITED STATES PATENTS

| | | | |
|---|---|---|---|
| 2,606,925 | 8/1952 | Whitman | 260—563 D |
| 3,155,724 | 11/1964 | Authur | 260—563 B |
| 3,347,917 | 10/1967 | Authur | 260—563 B |

JOSEPH REBOLD, Primary Examiner

D. R. PHILLIPS, Assistant Examiner

U.S. Cl. X.R.

260—563 D